United States Patent [19]

Shiraishi et al.

[11] Patent Number: 4,912,967
[45] Date of Patent: Apr. 3, 1990

[54] DEVICE FOR DETECTING A BAD ROAD FROM A MOVING VEHICLE

[75] Inventors: Shuji Shiraishi; Takashi Nishihara; Hironobu Kiryu; Naoki Omomo, all of Wako, Japan

[73] Assignee: Honda Giken Kogyo Kabushiki Kaisha, Tokyo, Japan

[21] Appl. No.: 181,948

[22] Filed: Apr. 15, 1988

[30] Foreign Application Priority Data

Apr. 17, 1987 [JP] Japan .................................. 62-94391
Oct. 2, 1987 [JP] Japan .................................. 62-250166

[51] Int. Cl.$^4$ .............................................. G01B 5/28
[52] U.S. Cl. ..................................................... 73/105
[58] Field of Search .................. 73/104, 105; 180/197; 123/333, 481; 364/426.02

[56] References Cited

U.S. PATENT DOCUMENTS

| | | | |
|---|---|---|---|
| 3,880,118 | 6/1975 | Nims ..................................... | 73/105 |
| 4,064,844 | 12/1977 | Matsumoto et al. ................. | 123/481 |
| 4,432,430 | 2/1984 | Lind et al. ............................ | 180/197 |
| 4,721,176 | 1/1988 | Kabasin et al. ...................... | 123/333 |
| 4,724,939 | 2/1988 | Lockhart et al. .................... | 192/3.3 |
| 4,733,878 | 3/1988 | Kanazawa et al. .................. | 280/91 |

Primary Examiner—Robert R. Raevis
Attorney, Agent, or Firm—Armstrong, Nikaido, Marmelstein, Kubovcik & Murray

[57] ABSTRACT

A device for detecting a bad or bumpy road from a moving vehicle includes a plurality of wheel speed detectors for detecting the corresponding wheel speeds of a plurality of different wheels, an arithmetic circuit for calculating a difference between values detected in the individual wheel speed detectors, a filter, receiving outputs from the arithmetic circuit, for processing only components in a predetermined frequency band, and a determination circuit for determining if a vehicle is travelling on a bad road based on outputs from the filter. The device easily detects a bad road from a moving vehicle on the basis of outputs from said wheel speed detectors, without being affected by instantaneous variations in the wheel speeds.

9 Claims, 5 Drawing Sheets

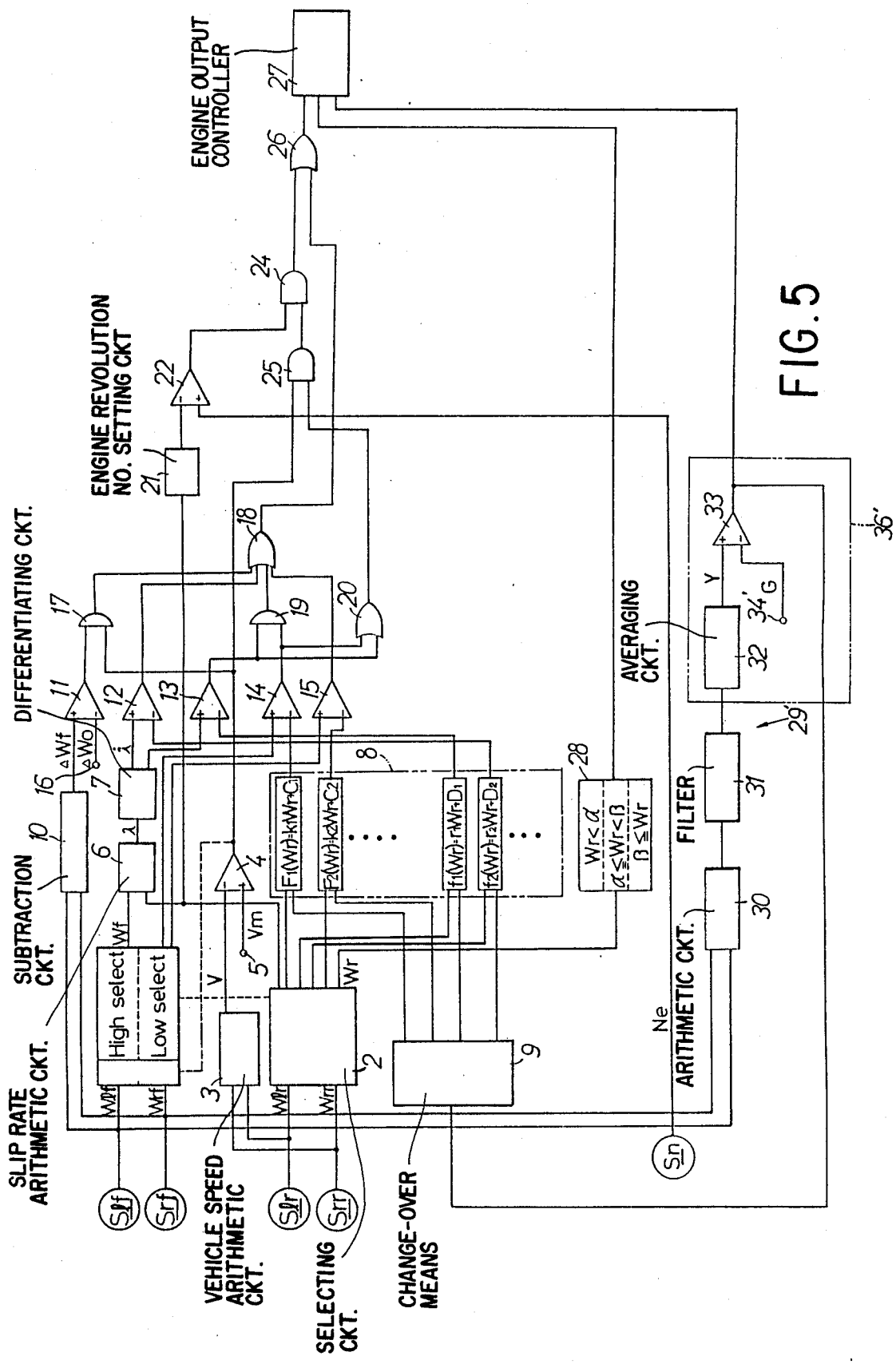

DEVICE FOR DETECTING A BAD ROAD FROM A MOVING VEHICLE

BACKGROUND OF THE INVENTION

1. Field of the Invention

The present invention relates to a device for detecting a bad road from a moving vehicle.

2. Description of the Prior Art

In such a conventional device for detecting a bad or bumpy road from a moving vehicle, an ultrasonic wave is emitted from an ultrasonic wave transmitter mounted on the vehicle, and a reflected wave from the road surface is received by a receiver in order to decide whether or not the vehicle is travelling on a bad road.

Often a conventional device for detecting a bad road, as described above, may be employed with a suspension control system in an effort to enable a comfortable drive on a bad road. In addition, two examples of traction control systems found in U.S. Pat. Nos. 4,432,430 and 4,589,511 may employ such bad road detector.

With the above conventional device, however, a special circuit is required to detect the bad road, thus resulting in an increased cost.

SUMMARY OF THE INVENTION

The present invention has been accomplished to overcome disadvantages of the conventional device and it is an object of the present invention to provide a device for detecting a bad road from a moving vehicle wherein the travelling of the vehicle on a bad road can be relatively easily detected on the basis of outputs from wheel speed detectors without being affected by instantaneous variation in such outputs, without a special ultrasonic transmitter and receiver.

To attain the above object, according to the present invention, a device is provided for detecting a bad road from a moving vehicle, comprising a plurality of wheel speed detectors for detecting the corresponding wheel speeds of a plurality of different wheels, an arithmetic circuit for calculating a difference between values detected in the individual wheel speed detectors, a filter, receiving outputs from the arithmetic circuit, for passing components in a predetermined frequency band, and a determination circuit for determining that the vehicle is travelling on a bad road on the basis of outputs from the filter.

Because it is known that the variation in wheel speeds is associated with a predetermined frequency when the vehicle is travelling on a bad road, the instant invention makes it possible to determine whether or not the vehicle is travelling on a bad road on the basis of the difference between the wheel speeds. Moreover, since only the varied components in the predetermined frequency band are passed by the filter, variations due to the yaw movement of the vehicle, or the like, can be eliminated to correctly detect a bad road.

In addition, in the above construction, if the determining circuit comprises an averaging circuit for calculating an average value of outputs from the filter in a predetermined time period, and a comparator which produces a signal indicative of decision of the bad road, when an output from the averaging circuit has exceeded a predetermined value, it is possible to detect the presence of a bad or irregular road from the moving vehicle independent of instantaneous variations in wheel speed.

Further, in the above construction, if the determining circuit includes a sensitivity adjuster for adjusting the detecting sensitivity of the circuit to weaken it when the vehicle speed increases, it is possible to optimize the prevention of accidental or unintended detection of the presence of a bad road from the moving vehicle when compared with the case where the detecting sensitivity is constant.

BRIEF DESCRIPTION OF THE DRAWINGS

The above and other objects, features and advantages of the invention will become apparent from reading the following description of the preferred embodiments, taken in conjunction with the accompanying drawings, wherein:

FIG. 5 is a block diagram illustrating a second embodiment of the instant invention.

DESCRIPTION OF THE PREFERRED EMBODIMENTS

Embodiments of the present invention when employed in a vehicle equipped with a six-cylinder engine will now be described with reference to the accompanying drawings.

Figure 1:
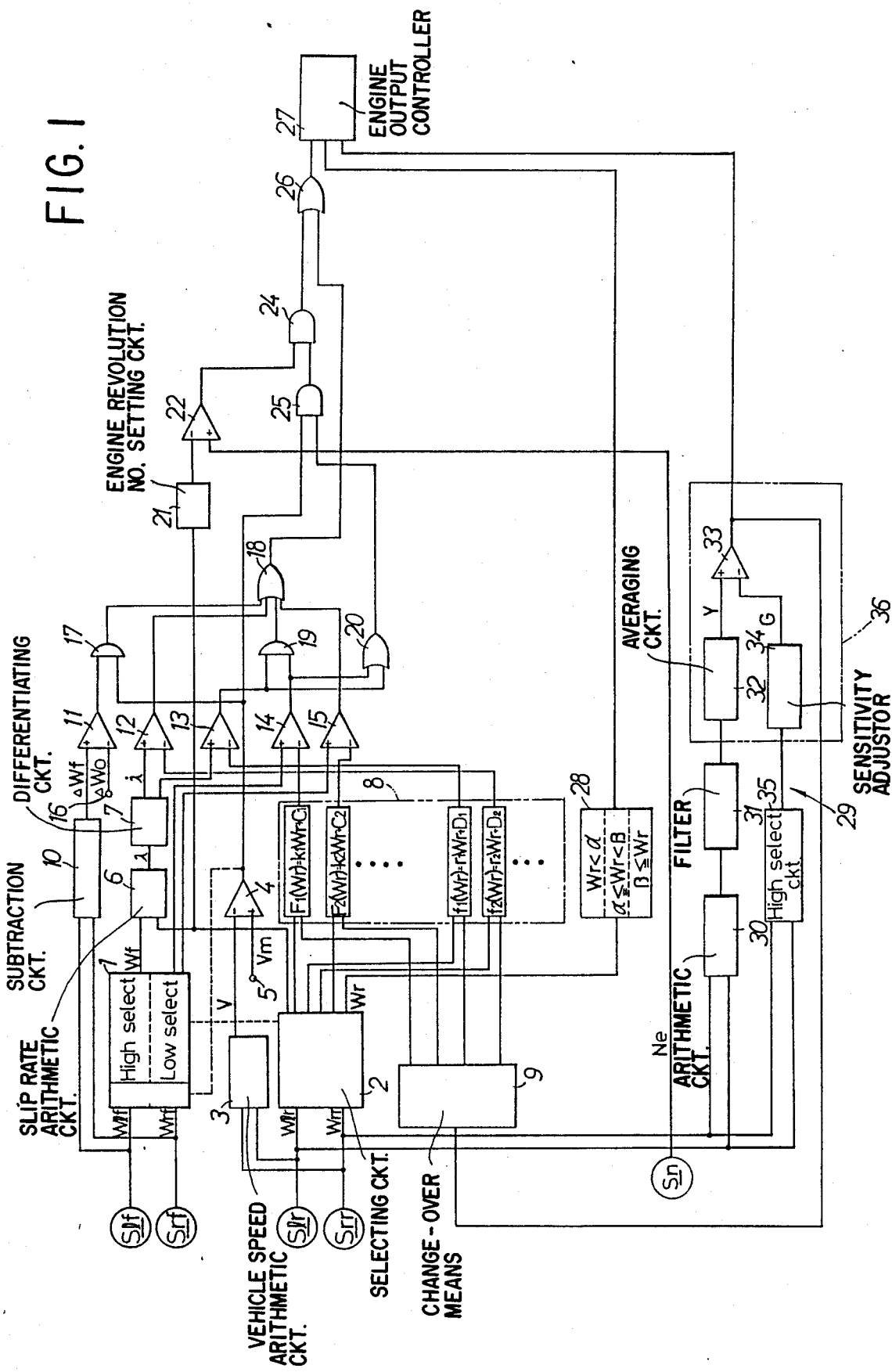
FIG. 1 is a block diagram of a first embodiment of the instant invention, which is employed in a vehicle equipped with a six-cylinder engine.

FIGS. 1 to 4 illustrate a first embodiment. Referring first to FIG. 1, the speeds Wlf and Wrf of left and right driving wheels in a vehicle, e.g., left and right front wheels in a front wheel drive vehicle, are detected by a left front wheel speed detector Slf and a right front wheel speed detector Srf, respectively. The speeds Wlr and Wrr of left and right trailing wheels, e.g., left and right rear wheels, are also detected by a left rear wheel speed detector Slr and a right rear wheel speed detector Srr, respectively.

The left and right front wheel speeds Wlf and Wrf, detected by the left and right front wheel speed detectors Slf and Srf, are delivered to a change-over selecting circuit 1 which is changed over between a high-selection mode which selects a higher one of the left and right wheel speeds Wlf and Wrf as a front wheel speed Wf, and a low-selection mode which selects a lower one of the left and right wheels speeds Wlf and Wrf as a front wheel speed Wf, depending upon the vehicle speed. If the vehicle speed is at an extremely low level, for example, lower than 4 km/hr, the change-over selecting circuit 1 changes to the low-selection mode.

On the other hand, the left and right rear wheel speeds Wlr and Wrr detected by the left and right rear wheel speed detectors Slr and Srr are input to a selecting circuit 2 which is operated in response to the selecting operation of the selecting circuit 1. Thus, the speed of the rear wheel on the same side as selected by the changeover selecting circuit 1 is selected by the selecting circuit 2. For example, when the left front wheel speed Wlf is selected as the front wheel speed Wf in the change-over selecting circuit 1, the left rear wheel speed Wlr is selected as the rear wheel speed Wr in the selecting circuit 2. This is for the purpose of eliminating a difference in length between left and right travel paths in a turn.

Values detected by the left and right rear wheel speed detectors Slr and Srr are also applied to a vehicle speed arithmetic circuit 3 where the vehicle speed is calculated according to the following equation:

$$V = \frac{Wlr + Wrr}{2} \qquad (1)$$

That is, an average value between the left and right rear wheel speeds Wlr and Wrr is delivered as a vehicle speed V from the vehicle speed arithmetic circuit 3, and such an output signal is supplied to an inverted input terminal of a comparator 4. A reference signal corresponding to an extremely slow speed value Vm, e.g., 4 km/hr, is supplied from a reference terminal 5 to a non-inverted input terminal of the comparator 4, and if the vehicle speed V is for example, at an extremely low speed lower than 4 km/hr, then a high level signal is produced from the comparator 4 and supplied to the change-over selecting circuit 1. Therefore, when the output from the comparator 4 assumes the high level, the change-over selecting circuit 1 changes to the low-selection mode.

The front wheel speed Wf selected in the change-over selecting circuit 1 and the rear wheel speed Wr selected in the selecting circuit 2 are applied to a slip rate arithmetic circuit 6 where the slip rate λ is calculated according to the following equation:

$$\lambda = \frac{Wf - Wr}{Wf} \qquad (2)$$

The slip rate λ calculated in the slip rate arithmetic circuit 6 is applied to a differentiating circuit 7 where a differential value $\dot{\lambda}$ (where $\dot{\lambda} = d\lambda/d\lambda$) of the slip rate λ is calculated.

For a characteristic value indicative of the slipped state of either the left or right driving wheel, i.e., front wheel, reference values respectively corresponding to the slip rate λ and the differential slip rate $\dot{\lambda}$ are set in a reference value determination circuit 8 in the form of a function of the rear wheel speed Wr representative of the vehicle speed. Moreover, a set of these references values are prepared for each road condition of a different coefficient of friction, for example, a flat road and a bumpy road (bad road).

More specifically, for the reference values corresponding to the slip rate λ, $F_1(Wr) = k_1 Wr + C_1$ and $F_2(Wr) = k_2 Wr + C_2$ are prepared for each of the road conditions. In addition, for the reference values corresponding to the differential slip rate $\dot{\lambda}$, $f_1(Wr) = r_1 Wr + D_1$ and $f_2(Wr) = r_2 Wr + D_2$ are prepared in correspondence to each road condition, wherein $k_1$, $k_2$, $C_1$, $C_2$, $r_1$, $r_2$, $D_1$ and $D_2$ are constants for determining the reference values $F_1(Wr)$, $F_2(Wr)$, $f_1(Wr)$ and $f_2(Wr)$ and prepared for each different road condition. These constants (generated in constant reference value change-over means 9) and the rear wheel speed Wr selected in the selecting circuit 2 are applied to the reference value determination circuit 8.

It should be noted that the reference values $F_1(Wr)$ and $f_1(Wr)$, having the subscript 1, are set for a preliminary control and at levels smaller than the reference values $F_2(Wr)$ and $f_2(Wr)$, having the subscript 2, and moreover all the references for bumpy (bad) roads are set at larger levels than the corresponding reference values for a flat road.

The values detected in the left and right front wheel speed detectors Slf and Srf are applied to a subtraction circuit 10 which provides an absolute value $|wlf - Wrf| = |\Delta Wf|$ of a difference between both the front wheel speeds Wlf and Wrf. The substraction circuit 10 is connected to a non-inverted input terminal of a comparator 11. A signal corresponding to a reference wheel speed difference $\Delta W_o$ is input from a reference terminal 16 to an inverted input terminal of the comparator 11. This permits the comparator 11 to generate a high level signal when the absolute value $|\Delta Wf|$ of the difference between front wheel speeds exceeds the reference wheel speed difference $\Delta W_o$. In other words, when it is decided that one of the front wheels is excessively slipping and racing, the comparator 11 produces the high level signal.

The differential slip rate $\dot{\lambda}$ calculated in the differentiating circuit 7 is applied to non-inverted input terminals of comparators 12 and 13. The reference value $f_2(Wr)$ corresponding to the differential slip rate $\dot{\lambda}$ is supplied from the reference value determination circuit 8 to an inverted input terminal of the comparator 12, while the reference value $f_1(Wr)$ is supplied to an inverted input terminal of the comparator 13. On the other hand, the front wheel speed Wf selected in the change-over selecting circuit 1 is input to non-inverted input terminals of comparators 14 and 15. Further, the reference value $F_1(Wr)$ corresponding to the slip rate λ is fed from the reference value determination circuit 8 to an inverted input terminal of the comparator 14, while the reference value $F_2(Wr)$ is fed to an inverted input terminal of the comparator 15.

The comparator 12 decides whether or not the differential slip rate $\dot{\lambda}$ is too large. The comparator 15 decides or not the slip rate λ is too large. The comparators 13 and 14 also decide whether or not the differential slip rate $\dot{\lambda}$ and the slip rate λ are too large. If these values are too large, then the comparators 13 and 14 produce high level outputs.

An output from the comparator 11 is applied to an input terminal of AND gate 17, while an output from the comparator 4 is applied to the other input terminal of the AND gate 17. More specifically, when the vehicle speed is extremely low and one of the front wheels is racing or spinning, the output from the AND gate 17 assumes a high level. The AND gate 17 is connected to OR gate 18.

In addition to the AND gate 17, outputs from the comparator 12, an AND gate 19 and the comparator 15 are applied to the OR gate 18. Outputs from the comparators 13 and 14 are applied to two input terminals of AND gate 19. Thus, an output from the OR gate 18 assumes a high level, when at least any one of the following cases is established: when the output from the AND gate 17 assumes a high level, that is, the vehicle speed is extremely low and one of the front wheels is racing; when the differential slip rate λ is too large; when the slip rate $\dot{\lambda}$ is too large; and when the output from AND gate 19 assumes a high level, that is, it is decided for preliminary control purposes that the wheel is about to begin slipping excessively.

The OR gate 18 is connected to one of the input terminals of an OR gate 26. The output terminals of the comparators 13 and 14 are connected respectively to input terminals of an OR gate 20 which is connected to one of the input terminals of an AND gate 25. Further, the output from the comparator 4 is input to the other input terminal of AND gate 25. Thus, an output from the AND gate 25 assumes a high level when the vehicle speed is extremely low and either the slip rate λ or the differential slip rate λ meets a deciding condition for deciding that the wheel is about to begin slipping excessively. The output of AND gate 25 is connected to one of the input terminals of AND gate 24.

Figure 2:
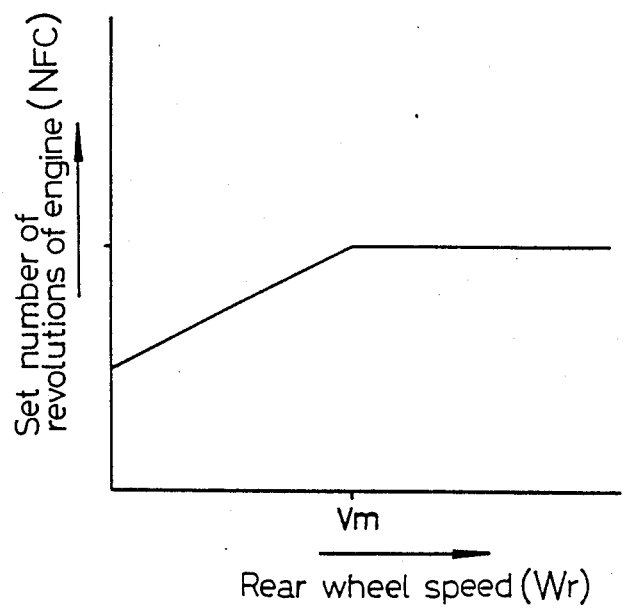
FIG. 2 is a graph illustrating the set number of revolutions of the engine.

An output of a comparator 22 is input to the other input terminal of AND gate 24, and an inverted input terminal of the comparator 22 is connected to an output terminal of an engine revolution-number setting circuit 21. The number of revolutions of engine relative to the rear wheel speed Wr, representative of the vehicle speed, is set in the engine revolution-number setting circuit 21, as shown in FIG. 2, and the rear wheel speed Wr selected in the selecting circuit 2 is applied to the engine revolution-number setting circuit 21. That is, the engine revolution-number setting circuit 21 produces a signal indicative of the set number $N_{FC}$ of revolutions of engine in accordance with the rear wheel speed Wr input thereto and applies it to the inverted input terminal of the comparator 22. Further, the value detected by engine revolution-number detector Sn is applied to a non-inverted input terminal of the comparator 22. Thus, the comparator 22 feeds a high level signal into AND gate 24 when the actual number Ne of revolutions of engine detected in the engine revolution-number detector Sn has exceeded the number $N_{FC}$ of revolutions of engine set in the engine revolution-number setting circuit 21. That is, the AND gate 24 produces a high level signal, as the number of revolutions of engine exceeds a set value when the vehicle speed is at an extremely low level and the front wheel is about to begin to slip excessively.

The output from AND gate 24 is applied to the other input terminal of the OR gate 26. The output from the OR gate 18 has been applied to the one input terminal of OR gate 26, as described above, and therefore, an output from the OR gate 26 assumes a high level, in response to the establishment of at least one of the following cases: when the driving or front wheel has slipped excessively; when the driving wheel is about to excessively slip; and when the number of revolutions of engine has exceeded the set value when the vehicle speed is extremely low and the driving wheel is about to slip excessively.

The output from the OR gate 26 is input to an engine output controller 27 which deactivates the combustion stroke of an engine to control the driving force, thereby preventing an excessive slippage of the driving wheel. When the output from the OR gate 26 has assumed the high level, the engine output controller 27 deactivates the combustion stroke of the engine. Moreover, the engine output controller 27 deactivates the combustion strokes of cylinders of the number set in a cylinder-number determination circuit 28 concurrently with a change of constants k1, k2, C1 and C2 output from the reference value change-over means 9 in response to detection, by a bad road detecting device 29, of the situation that the vehicle is travelling on a bad road. That is, when the vehicle is travelling on the bad road, excessive slippage is acceptable to some extent, and supplying of fuel to the cylinders of the number selected according to the rear wheel speed Wr, representative of the vehicle speed, is cut off by means of the engine output controller 27.

The rear wheel speed Wr is fed from the selecting circuit 2 to the cylinder-number determination circuit 28. The numerals indicative of the numbers of cylinders are set in the cylinder-number determination circuit 28, for example, the number 3 when the rear wheel speed Wr is less than a set value α, e.g., 12 km/hr (Wr<α), for example, the numeral 4 when the rear wheel speed Wr is more than the set value α and less than a set value β, e.g., 20 km/hr (α≦Wr<β), and for example, the number 6 when the rear wheel speed Wr is more than the set value (β≦Wr). A signal corresponding to each of the numbers of cylinders is applied to the engine output controller 27. That is, as the vehicle speed represented by the rear wheel speed Wr is reduced, the number of cylinders whose combustion stroke is deactivated is reduced.

The bad road detecting device 29 comprises rear wheel speed detectors Slr and Srr, an arithmetic circuit 30, a filter 31, a determination circuit 36 and a high selection circuit 35. The rear wheel speed detectors Slr and Srr are connected to the arithmetic circuit 30 and the high selection circuit 35, respectively. A difference ΔWr (Wlr−Wrr) between both rear wheel speeds is calculated in the arithmetic circuit 30, while the higher of both rear wheel speeds Wlr and Wrr is selected as one representative of the vehicle speed in the high selection circuit 35. The determination circuit 36 comprises an averaging circuit 32, a comparator 33 and a sensitivity adjuster 34.

The filter 31 is of a recursive type which passes only those components of varied values of the difference ΔWr which are in a given frequency band about predetermined resonance frequencies, e.g., 10 to 15 Hz of a vehicle suspension in a moving direction of the vehicle or in a vertical direction, and in the filter 31, a calculation is made according to the following equation:

$$Y_n = A_1 \cdot Y_{n-1} + A_2 \cdot Y_{n-2} + A_3 \cdot Y_{n-3} \ldots + B_1 \cdot X_n + B_2 \cdot X_{n-1} + B_3 \cdot X_{n-2} \qquad (3)$$

wherein $A_1, A_2, A_3 \ldots B_1, B_2, B_3 \ldots$ are constants the determination of which forms the band-pass filter: $Y_n$, $Y_{n-1}, \ldots$ are values output from the filter 31; and $X_n$, $X_{n-1}, \ldots$ are feedback values, with the subscripts n, n−1, n−2, ... representing a present value, the previous value, the next previous value, and so on.

A time-average value of the outputs from the filter 31 is calculated in the averaging circuit 32 (wherein the "time-average value" indicates a value obtained by averaging the outputs within a predetermined time), and an output Y from the averaging circuit 32 is applied to a noninverted input terminal of the comparator 33. On the other hand, the rear wheel speed Wlr or Wrr selected in the high selection circuit 35 is applied to the sensitivity adjuster 34 as a speed representative of the vehicle speed. Moreover, an output value or reference value G is set in the sensitivity adjuster 34 to increase as the vehicle speed increases, and a signal corresponding to the reference value G output from the sensitivity adjuster 34 is applied to an inverted input terminal of the comparator 33. Thus, when the time-average value of the difference values between the rear wheel speeds in the given frequency band has exceeded the reference value G, the comparator 33 supplies a high level signal to the engine power controller 27 on the basis of a decision that the vehicle is traveling on a bad road. Moreover, the detecting sensitivity thereof is reduced as the vehicle speed is increased.

When the vehicle is travelling on a bad road, the bad road detecting device 29 enables the condition that the vehicle is travelling on a bad road to be easily and correctly detected on the basis of the fact that the variation in wheel speed is associated with the resonance frequency of the vehicle suspension. Because of the decision from the time-average value, the condition that the vehicle is travelling on a bad road can be detected independent of instantaneous variations.

Figure 3:
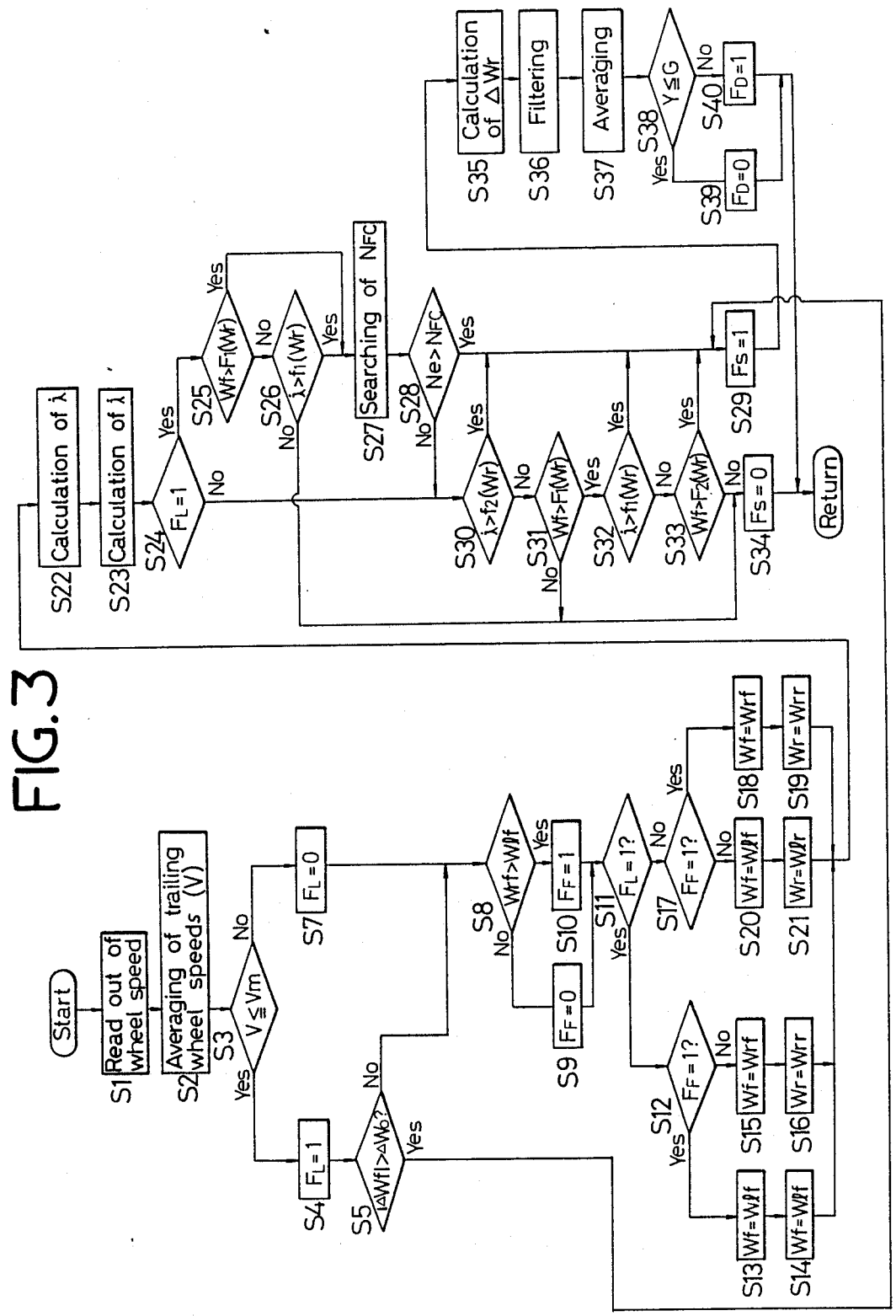
FIGS. 3 and 4 are flow charts each illustrating a controlling procedure during the movement of the vehicle.

The operation of this embodiment will be described below. Referring to FIG. 3 illustrating a control procedure, the individual wheel speeds Wlf, Wrf, Wlr, and Wrr are read in a first step S1, and the trailing wheel speeds Wlr and Wrr are averaged to provide a vehicle speed V in second step S2. Then, it is decided in a third step S3 whether or not the vehicle speed V is lower than the set value Vm, i.e., whether or not the vehicle speed V is at an extremely low level. When it is decided in the third step S3 that the vehicle speed V is at the extremely low level, a flag $F_L$ becomes "1" in a fourth step S4, progressing to a fifth step S5.

In the fifth step S5, it is decided whether or not the absolute value $|\Delta Wf|$, or a difference between the driving wheel speeds, exceeds the set value $\Delta W_o$. That is, it is decided whether or not either one of the front wheels is racing, and when it is decided that such one wheel is not racing, i.e., $|\Delta Wf| \leq \Delta W_o$, progress is made to an eighth step S8. Also, when the vehicle speed V is decided not to be at the extremely low level at the third step S3, the flag $F_L$ becomes "0" in a seventh step S7, progressing to the eighth step S8. Further, when it is decided at the fifth step S5 that the one driving wheel is racing, progress is made to a 29th step S29.

At the eighth step S8, it is decided whether or not the right front wheel speed Wrf is larger than the left front wheel speed Wlf. That is, the magnitudes of the both front wheel speeds are compared at the eighth step S8, because one of the front wheel speeds is selected as a front wheel speed in the change-over selecting circuit 1 depending upon either the high selection mode or the low selection mode. When Wrf > Wlf is decided in the eighth step S8, a flag $F_F$ becomes "0" at the ninth step S9, followed by an 11th step S11. When Wrf > Wlf is decided in the eighth step S8, the flag $F_F$ is changed to "1" at a 10th step S10, followed by the 11th step S11.

In the 11th step S11, it is decided whether or not the vehicle speed is extremely low, i.e., $F_L = 1$. When $F_L = 1$, i.e., when the vehicle speed is extremely low, it is decided in a 12th step S12 whether or not the right front wheel speed Wrf is larger than the left front wheel speed Wlf, i.e., whether or not $F_F$ is "1". When $F_F = 1$, Wf = Wlf is established in a 13th step S13 and then, Wr = Wlr is established in a 14th step S14, progressing to a 22nd step S22. On the other hand, when $F_F = 0$ at the 12th step S12, Wf = Wrf is established in the 15th step S15 and the, Wr = Wrr at 16th step S16, progressing to the 22nd step S22.

When $F_L = 0$ in the 11th step S11, i.e., when the vehicle speed is not at the extremely low level, it is judged in a 17th step S17 whether or not $F_F$ is "1". When $F_F = 1$, a step is taken from the 17th step S17 successively to 18th and 19th steps S18 and S19 where Wf = Wrf and Wr = Wrr are established, proceeding to the 22nd step S22. Alternatively, when $F_F = 0$ at the 17th step S17, a step is taken to 20th step and 21st step S20 and S21 in succession, where Wf = Wlf and Wr = Wlr are established, proceeding to the 22nd step S22.

In the 22nd step S22, the slip rate $\lambda$ is calculated and then, in a 23rd step S23, the differential slip rate $\dot{\lambda}$ is calculated. At a 24th step S24, it is judged whether or not the vehicle speed is extremely low, i.e., whether or not $F_L = 1$. When $F_L = 1$, i.e., when the vehicle speed is extremely low, a step is taken to a 25th step S25, whereas when F = 0, i.e., when the vehicle speed is not extremely low, a step is taken to a 30th step S30. In the 25th step S25, it is judged whether or not Wf > $F_1$ (Wr). When Wf > $F_1$ (Wr), a step is taken to a 27th step S27, whereas when Wf $\leq F_1$ (Wr), a step is taken to a 26th step S26. In step S26, it is decided whether or not $\dot{\lambda}$ > $f_1$ (Wr). When $\dot{\lambda}$ > $f_1$ (Wr), a step is taken to a 27th step S27, on the one hand, and when $\dot{\lambda} \leq f_1$ (Wr), a step is taken to a 34th step S34, on the other hand. In step S27, the set number $N_{FC}$ of revolutions of engine according to the rear wheel speed Wr is searched from a table shown in FIG. 2, and in step S28, the searched set number $N_{FC}$ of revolutions of engine is compared with the actual number Ne of revolutions of engine. If Ne > $N_{FC}$, a step is taken to a 29th step S29, while if Ne $\leq N_{FC}$, a step is taken to the 30th step S30.

At the 30th step S30, the aforesaid differential slip rate $\dot{\lambda}$ is compared with the reference value $f_2$ (Wr); and if $\dot{\lambda}$ > $f_2$ (Wr), a step is taken to the 29th step S29. On the other hand, if $\dot{\lambda} \leq f_2$ (Wr), a step is taken to a 31st step S31. In the step S31, it is decided whether or not Wf > $F_1$ (Wr). If Wf > $F_1$ (Wr), a step is taken to a 32nd step S32, whereas if Wf $\leq F_1$ (Wr), a step is taken to a 34th step S34. In step S32, it is decided whether or not $\dot{\lambda}$ > $f_1$ (Wr). If yes, a step is taken to the 29th step S29, whereas if $\dot{\lambda} \leq f_1$ (Wr), a step is taken to a 33rd step S33. In step S33, it is decided whether or not Wf > $F_2$ (Wr). If Wf > $F_2$ (Wr), a step is taken to the 29th step S29, whereas if Wf $\leq F_2$ (Wr), a step is taken to the 34th step S34. In the 29th step and 34th steps S29 and S34, a flag $F_S$ is set at "1" and "0", respectively. If the flag $F_S$ is set at "1" in the step S29, a step is taken to a 35th step S35.

When steps S25 and S26 are yes, this means that the vehicle is travelling at an extremely low speed and is about to slip excessively. In addition, the flag $F_S$ represents the condition when the vehicle is slipping excessively or is about to slip excessively. That is, $F_S = 1$ indicates that the vehicle is slipping excessively or is about to slip excessively and hence, the fuel is cut to the engine, as described below.

The 35th step S35 and succeeding steps indicate a procedure for the detection of the bad road by detecting device 29. At the 35th step S35, the difference Wr between the both rear wheel speeds Wlr and Wrr is calculated, and at the 36th step S36, the filtering is carried out. The above-described components of the difference $\Delta$Wr picked by the filtering are time-averaged at the 37th step S37, and the resulting time-average value Y is judged in the 38th step S38 whether or not it is smaller than the reference value G. When Y $\leq$ G in the 38th step 38, i.e., when the vehicle is not travelling on a bad road, a flag $F_D$ is set at "0". On the other hand, when Y > G, i.e., when it is decided that the vehicle is travelling on a bad road, the flag $F_D$ is set at "1".

Figure 4:
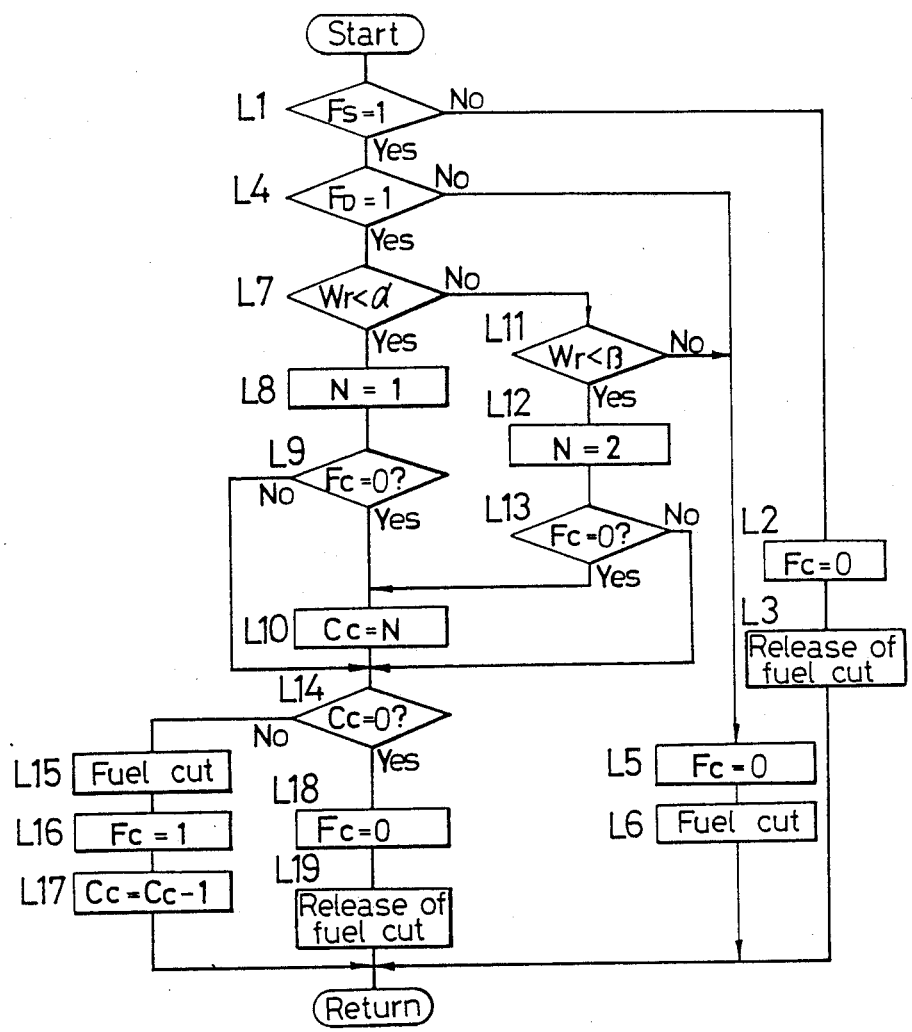

After completion of the procedures for deciding whether or not the vehicle is slipping excessively or is about to slip excessively, i.e., whether or not the flag $F_S$ is at "1" and whether or not the vehicle is travelling on the bad road, i.e., the flag $F_D$ is at "1", as described above, the controlling of the engine power is carried out according to a procedure illustrated in FIG. 4.

Referring to FIG. 4, it is decided in a first step L1 whether or not the flag $F_S$ is "1", i.e., whether the vehicle is slipping excessively or is about to slip excessively. If $F_S = 0$, a step is taken to a second step L2 where a flag $F_C$ is set at "0". This flag $F_C$ represents whether or not the fuel cut step for controlling the number of cylinders has been performed in the immediately proceeding control cycle, and $F_C=1$ indicates that the fuel cut step for controlling of the number of cylinders has been performed. At the next third step L3, the fuel cut command is released, resulting in a normal operation of engine.

When $F_S=1$ in the first step L1, a step is taken to a fourth step L4 where it is decided whether or not the vehicle is travelling on a bad road, i.e., whether or not $F_D=1$. If $F_D=0$ is established in a fifth step L5, and then, the supply of fuel is cut off in a sixth step L6. More specifically, when the vehicle is slipping excessively or is about to slip excessively during travelling on a road which is not a bad road, controlling of the number of cylinders is not conducted, and the combustion stroke of each of the cylinders is inoperative until excessive slipping no longer occurs.

When $F_D=1$ in the fourth step L4, a step is taken to a seventh step L7 where it is decided whether or not the rear wheel speed Wr, repesentative of the vehicle speed, is lower than $\alpha$, e.g., 12 km/hr. When $Wr>\alpha$, $N=1$ is established in an eighth step L8 and then, it is judged in a ninth step L9 whether or not $F_C=0$. When $F_C=0$, a count value $C_C$ is set at N in a 10th step, L10, proceeding to a 14th step L14. When $F_C=1$, the 10th step L10 is skipped proceeding to the 14th step L14.

When $Wr\geq a$ in the seventh step L7, it is decided in an 11th step L11 whether or not $Wr>\beta$ (e.g., 20 km/hr). When $\alpha\leq Wr>\beta$, $N=2$ is established in a 12th step L12 and then, it is judged in a 13th step L13 whether or not $F_C=0$. When $F_C=0$, a step is taken to the 10th step L10. When $F_C=1$, a step is taken to the 14th step L14. Alternatively, when $Wr\geq\beta$, a step is taken from the 11th step L11 to the fifth step L5.

At the 14th step L14, it is judged whether or not the count value $C_C$ is "0". When $C_C=1$, a fuel cut command is effected in a 15th step L15; $F_C=1$ is established in a 16th step L16 and $C_C=C_C-1$ is established in a 17th step L17. Alternatively, when $C_C=0$ in the 14th step L14. $F_C=0$ is established in an 18th step 18 and then, the fuel cut command is released at a 19th step L19.

The controlling procedure will be summarized as follows: As the vehicle is slipping excessively or is about to slip excessively, fuel cut control for all cylinders is carried out when the vehicle is travelling on a road which is not bad, or when $Wr\geq\beta$ even if the vehicle is travelling on a bad road. Alternatively, when the vehicle is travelling on a bad road and $Wr<\alpha$, the supply of fuel is cut for every other cylinder, i.e., fuel cut is effected for three out of six cylinders. Alternatively when the vehicle is travelling on a bad road and $\alpha\leq Wr<\beta$, adjacent two cylinders are subjected to a fuel cut command, but a cylinder next to the two adjacent cylinders is not subjected to the fuel cut, i.e., four out of six cylinders are subject to the fuel cut.

In this manner, when the vehicle is slipping excessively or is about to slip excessively, the fuel cut control for the number of cylinders corresponding to the vehicle speed, depending upon whether or not the vehicle is travelling on a bad road, is effected, thus resulting in a reduction in driving force, which decreases or avoids excessive slippage. Moreover, in detecting a bad road, a value obtained by averaging the values of the difference between the railing wheel speeds within a predetermined time is compared with the reference value G, wherein the difference between the trailing wheel speeds increases as the vehicle speed increases. Therefore, if the reference value G is constant, the travelling of the vehicle is liable to be unintendedly or accidentally detected to be on a bad road, as the vehicle speed increases. However, the arrangement in this embodiment is such that the reference value G increases as the vehicle speed increases and hence, it is possible to optimize the prevention of accidental or unintended detection of a bad road.

The above embodiment illustrates the bad road detecting device 29 which comprises the high selection circuit 35 for selecting the higher one of the left and right rear wheel speeds Wlr and Wrr as a vehicle speed, and a sensitivity adjuster 34 to which is applied the vehicle speed selected in circuit 35 and which increases the reference value G as the vehicle speed increases. With this device 29, a signal corresponding to the variable reference value G delivered from the sensitivity adjustor 34 is applied to the inverted input terminal of the comparator 33. Alternatively, the high selection circuit 35 and the sensitivity adjuster 34 may be eliminated from the bad road detecting 29, so that only a signal corresponding to a fixed reference value G may be applied to the inverted input terminal.

FIG. 5 illustrates a second embodiment of the present invention having such an arrangement. In the second embodiment, when the time-average value of the differences ΔWr between the rear wheel speeds in a given frequency band exceeds a fixed reference value G, the comparator 33 applies a high level signal to the engine output controller 27 on the basis of the decision that the vehicle is travelling on a bad road.

More specifically, a determination circuit 36' in a bad road detecting device 29' in the embodiment shown in FIG. 5 includes a reference terminal 34' which produces a signal corresponding to the fixed reference value G. This signal is applied to the inverted input terminal of the comparator 33 and compared with an output Y received in the noninverted input terminal of the comparator 33 from the averaging circuit 32.

Unlike the first embodiment, front wheel speed detectors Slf and Srf are connected to the arithmetic circuit 30 of the bad road detecting device 29' in the second embodiment. Therefore, in the arithmetic circuit 30, a difference ΔWf (Wlf−Wrf) between the both front wheel speeds is calculated. For this reason, in the controlling procedure, the 35th step S35 in the first embodiment illustrated in FIG. 3 is changed to a step of "calculating ΔWf" in the second embodiment. Other steps are similar to those in the first embodiment.

Although the fuel cut has been conducted by means of the engine output controller 27 to control the driving force in the above two embodiments, it should be understood that an intake throttle valve control device driven, for example, by a pulse motor may be operated to bring an intake throttle valve to a closed position; either the timing of ignition by a spark ignitor of an engine may be angularly delayed or such ignition may be cut off, or the supercharging pressure may be reduced by a device for controlling the supercharging pressure of an intake air supplied to an engine.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A device for detecting irregular road from a moving vehicle, comprising:
   a plurality of wheel speed detectors for detecting corresponding wheel speeds of a plurality of wheels of the vehicle;
   an arithmetic circuit for calculating the difference between wheel speeds detected by the individual wheel speed detectors;
   a filter receiving an output from said arithmetic circuit and passing components in a predetermined frequency band to an output; and
   a determination circuit means, receiving said filter output, for determining if the vehicle is travelling on a bad or bumpy road, in response to the filter output, and outputting a signal indicative thereof.

2. The device of claim 1, wherein said predetermined frequency band is set to a band generally corresponding to the resonant frequencies of the vehicle suspension occurring in a vehicle-advancing direction and in a vertical direction.

3. The device of one of claims 1 or 2, wherein said wheel speed detectors include detectors for detecting the wheel speeds of the left and right trailing wheels of the vehicle, and inputting said left and right trailing wheel speeds to said arithmetic circuit.

4. The device of one of claims 1 or 2, wherein said wheel speed detectors include detectors for detecting the wheel speeds of the left and right driving wheels, and inputting said left and right driving wheel speeds to said arithmetic circuit.

5. The device of one of claims 1 or 2, wherein said determination circuit means includes an averaging means for calculating a time-average of the outputs from said filter, and a comparing means, receiving an output from said averaging means, for outputting said irregular road signal when said output of said averaging means exceeds a predetermined value.

6. The device of claim 5, wherein said determination circuit means further includes a sensitivity adjuster means for adjusting a determination sensitivity of said determination circuit means and reducing the determination sensitivity in response to an increase in a vehicle speed, and wherein the output of said sensitivity adjuster means is said predetermined value of said comparing means.

7. The device of claim 6, further comprising a selecting circuit, receiving inputs from left and right trailing wheel speed detectors, for outputting the higher of the two wheel speeds to said sensitivity adjuster means.

8. A device for detecting an irregular road from a moving vehicle, comprising:
   a wheel speed detector for detecting a wheel speed of the vehicle,
   an arithematic circuit for eliminating from the output of the wheel speed detector an amount corresponding to a vehicle speed;
   a filter receiving an output from said arithmetic circuit and passing components in a predetermined frequency band to an output; and
   a determination circuit means, receiving said filter output, for determining if the vehicle is travelling on an irregular road, in response to the filter output, and outputting a signal indicative thereof.

9. A device for detecting an irregular road from a moving vehicle, comprising:
   wheel speed detector for detecting a wheel speed of the vehicle;
   a wheel speed variation detecting means for detecting a variation in the level of an output from the wheel speed detector;
   a reference value generating means for generating a reference value variable in response to a vehicle speed; and
   a detecting means for detecting a road surface to be irregular when the output from the wheel speed variation detecting means is greater than the reference value fed from the reference value generating means.

* * * * *